(12) United States Patent
Jiang et al.

(10) Patent No.: US 11,671,830 B2
(45) Date of Patent: Jun. 6, 2023

(54) CONNECTING ACCESS POINT TO WIRELESS MULTI-HOP NETWORK BASED ON A NETWORK ROLE OF THE ACCESS POINT

(71) Applicant: Hewlett Packard Enterprise Development LP, Houston, TX (US)

(72) Inventors: Yafeng Jiang, Beijing (CN); Chunfeng Wang, Beijing (CN); Qiang Zhou, Sunnyvale, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 547 days.

(21) Appl. No.: 16/807,529

(22) Filed: Mar. 3, 2020

(65) Prior Publication Data
US 2021/0282013 A1    Sep. 9, 2021

(51) Int. Cl.
*H04L 29/06*    (2006.01)
*H04L 29/08*    (2006.01)
(Continued)

(52) U.S. Cl.
CPC ....... *H04W 12/069* (2021.01); *H04L 63/0869* (2013.01); *H04W 12/03* (2021.01);
(Continued)

(58) Field of Classification Search
CPC ............... H04W 12/069; H04W 76/19; H04W 12/0433; H04W 12/03; H04W 12/041;
(Continued)

(56) References Cited

U.S. PATENT DOCUMENTS 7,874,483 B2 *  1/2011  Wang .................... H04W 40/02
                                                370/310
8,191,785 B2 *  6/2012  Qu ....................... H04W 36/385
                                                235/462.07
(Continued)

FOREIGN PATENT DOCUMENTS

BR    112021015536 A2 *  10/2021   ......... H04L 41/0806

OTHER PUBLICATIONS

Argenox Technologies LLC., "BLE Advertising Primer", available online at <https://web.archive.org/web/20190121163331/http://www.argenox.com/bluetooth-low-energy-ble-v4-0-development/library/a-ble-advertising-primer/>, Jan. 21, 2019, 9 pages.
(Continued)

*Primary Examiner* — Haresh N Patel
(74) *Attorney, Agent, or Firm* — Hewlett Packard Enterprise Patent Department

(57) ABSTRACT

In embodiments of the present disclosure, there is provided an approach for connecting an access point (AP) to a wireless multi-hop network. An electronic device obtains device information of the AP in a wireless manner, and the electronic device and the AP can establish a wireless trusted connection based on the device information. Then, the electronic device transmits a configuration to the AP over the wireless trusted connection, wherein the configuration at least indicates an identifier of a wireless multi-hop network and a network role of the AP in the wireless multi-hop network. The AP then connects to the wireless multi-hop network according to the configuration. Embodiments of the present disclosure provide a wireless trusted way to provision an AP, which requires little manual intervention and technical expertise, while ensuring the safety of the provisioning.

17 Claims, 7 Drawing Sheets

(51) Int. Cl.
*H04W 12/069* (2021.01)
*H04W 76/19* (2018.01)
*H04L 9/40* (2022.01)
*H04W 12/03* (2021.01)
*H04W 12/041* (2021.01)
*H04W 12/0433* (2021.01)
*H04L 29/12* (2006.01)
*H04W 88/08* (2009.01)
*H04W 84/18* (2009.01)

(52) U.S. Cl.
CPC ..... *H04W 12/041* (2021.01); *H04W 12/0433* (2021.01); *H04W 76/19* (2018.02); *H04W 84/18* (2013.01); *H04W 88/08* (2013.01)

(58) Field of Classification Search
CPC .... H04W 84/18; H04W 88/08; H04L 63/0869
USPC .......................................................... 713/169
See application file for complete search history.

(56) References Cited

U.S. PATENT DOCUMENTS

| | | | | |
|---|---|---|---|---|
| 9,092,610 B2* | 7/2015 | Sheu | .................. | G06F 21/44 |
| 9,769,655 B2* | 9/2017 | Sheu | .................. | H04W 12/04 |
| 10,129,745 B2* | 11/2018 | Lv | .................. | H04L 67/104 |
| 10,169,587 B1 | 1/2019 | Nix | | |
| 2016/0204951 A1* | 7/2016 | Walton | .................. | H04M 15/51 |
| | | | | 370/259 |
| 2017/0295448 A1 | 10/2017 | McCann et al. | | |
| 2018/0109381 A1 | 4/2018 | Cammarota et al. | | |
| 2020/0145391 A1* | 5/2020 | Sasidharan | .......... | H04L 9/0819 |
| 2020/0196219 A1* | 6/2020 | Hashemi | .............. | H04W 40/06 |
| 2020/0221367 A1* | 7/2020 | Hashemi | .............. | H04W 40/34 |
| 2020/0228974 A1* | 7/2020 | Miyake | ................ | H04L 9/0841 |
| 2020/0344608 A1* | 10/2020 | Duo | .................... | H04W 80/10 |

OTHER PUBLICATIONS

Radius Networks Support, "Configuring Developer Kit Beacons with Eddystone", available online at <https://support.radiusnetworks.com/hc/en-us/articles/205022884-How-do-I-configure-Eddystone-Developer-Kit-beacons->, retrieved on Apr. 16, 2020, 10 pages.

Hoelscher, P., What is WPA3, is It Secure and Should I Use It?, (Research Paper), Aug. 27, 2018, 22 Pgs.

Horowitz, M., WiFi Encryption, (Web Page), Apr. 11, 2019, 5 Pgs.

Sarikaya, B. et al., Secure IoT Bootstrapping: a Survey Draft-sarikaya-t2trg-sbootstrapping-02, (Research Paper), Jan. 12, 2017, 20 Pgs.

Wi-Fi Easy Connect, (Web Page), Retrieved May 27, 2019, 3 Pgs.

* cited by examiner

CONNECTING ACCESS POINT TO WIRELESS MULTI-HOP NETWORK BASED ON A NETWORK ROLE OF THE ACCESS POINT

BACKGROUND

An access point (AP) is a networking device that allows wireless devices such as Wi-Fi devices to connect to a network such as Wide Area Network (WAN). Usually the AP may connect to a router or a switch, via a wired or wireless network, as a standalone device. It is also possible to implement an AP as an integral component of the wireless router or the wireless switch. In operation, an AP provides wireless connections to other devices using wireless Local Area Network (WLAN) technology, for example.

Generally, the WLANs can be classified as a wireless single-hop network and a wireless multi-hop network. In a wireless single-hop network, each AP is wired to the network, and the user devices directly connect to the wired AP. In a wireless multi-hop network, one or more APs are wired to the network, while the other APs are connected to those wired APs, so that user devices can connect to the wired AP through the intermediate or relaying APs.

BRIEF DESCRIPTION OF THE DRAWINGS

Embodiments of the present disclosure may be understood from the following Detailed Description when read with the accompanying Figures. In accordance with the standard practice in the industry, various features are not drawn to scale. In fact, the dimensions of the various features may be arbitrarily increased or reduced for clarity of discussion. Some examples of the present disclosure are described with respect to the following figures.

DETAILED DESCRIPTION

Figure 1:
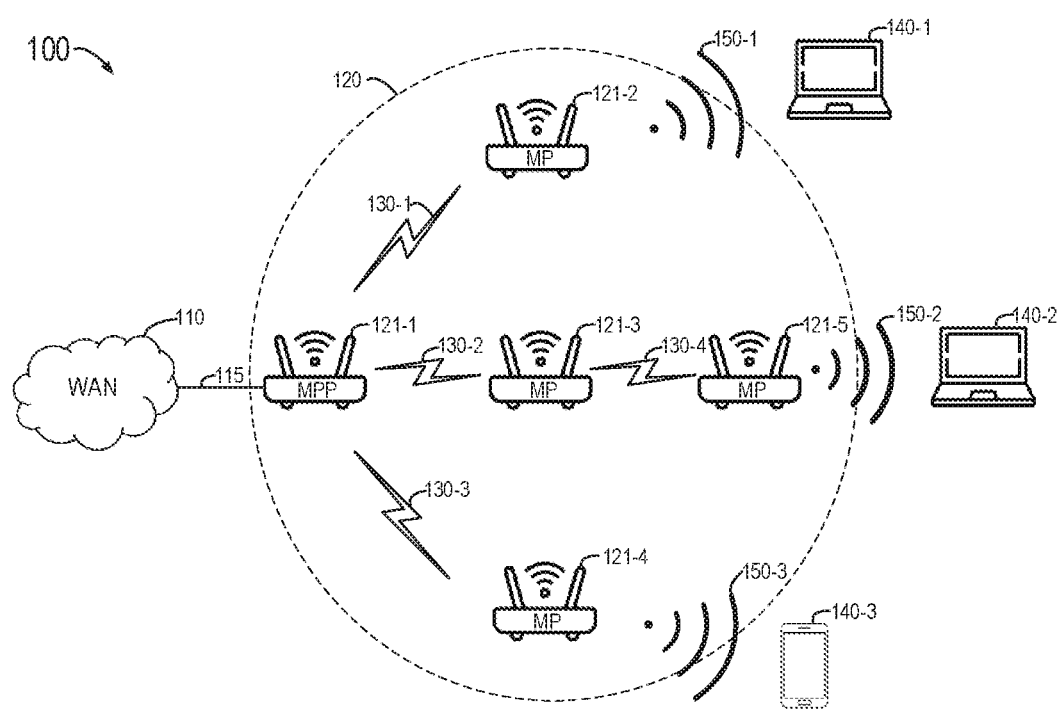
FIG. 1 illustrates an example environment in which embodiments of the present disclosure can be implemented.

It is to be understood that although some embodiments of the present disclosure use a mesh network as an example of the wireless multi-hop network, any other wireless multi-hop network which includes multiple hops between the APs, either currently known or to be developed in future, may be used in combination with the embodiments of the present disclosure. In addition, although Device Provision Protocol (DPP) is used in some embodiments for performing the mutual authentication between the electronic device and the AP and/or enforcing the configuration, other authentication methods, either currently known or to be developed in future, may be used in combination with the embodiments of the present disclosure.

The wireless multi-hop network may use two or more wireless hops to convey information from a source to a destination. Examples of the wireless multi-hop network include, but are not limited to, a mesh network. A mesh network is a communication network comprising radio nodes such as APs in mesh topology. To configure and deploy APs in the multi-hop network, it is required to provide the configuration for each AP, which is called a provisioning process. Once the corresponding configuration is obtained, the AP can connect to other AP(s) and join the multi-hop network.

Traditionally, the AP connects to a backend controller to obtain a configuration via a wired connection. It will be appreciated that the wired connection based provisioning is complex and time-consuming. Alternatively, it is also possible to access the AP's local user interface (UI) via a wired or wireless connection. This process, however, is slow and needs many human interventions. Thus, conventionally it is complicated to set up a wireless multi-hop network.

Embodiments of the present disclosure propose a way for provisioning AP(s) for a wireless multi-hop network in a wireless trusted way, which requires less intervention and technical expertise from a user than the traditional ways, while ensuring the safety of the provisioning of the AP. Through the following descriptions of some example embodiments, it will be appreciated that embodiments of the present disclosure do not require connecting every AP to the wired LAN for provisioning. As a result, deployment of a wireless multi-hop network is more effective and efficient compared with the traditional ways.

Optionally, in some embodiments of the present disclosure, a DPP can be used to facilitate mutual authentication between an electronic device and an AP, so that the safety of the provisioning process of the AP can be ensured. The wireless multi-hop network may be a mesh network, and DPP configuration protocol needs to be extended so as to adapt to the characteristics of the mesh network. For example, the network role parameter in the DPP configuration protocol may be extended to add the values of a mesh portal (MPP) and a mesh point (MP), and the mesh identifier parameter may be added in the DPP configuration protocol such that the AP can join the configured mesh network based on the mesh identifier. Moreover, in some embodiments, the DPP configuration protocol may be further extended to support more parameters specific to the mesh network, such as a path selection protocol identifier and a path selection metric identifier for the path selection of the AP.

Alternatively, or in addition, in some embodiments, the AP obtains its configuration for connecting to the mesh network based on the DPP provisioning process, and then connects to other AP(s) in the mesh network according to its network role. For example, if an AP is configured as an MPP role, it will broadcast the identifier of the mesh network and wait for the connection from other APs. If an AP is configured as an MP role, it will scan other AP(s) and try to connect other AP(s) based on the mesh identifier and the credential for connecting. In this way, the AP may join the mesh network automatically after obtaining its configuration in a wireless trusted way.

In yet other embodiments, an automatic recovery for a failed AP can be provided without any human intervention. Traditionally, some APs (such as MPs) are deployed in high places that are difficult to reach physically for the users or the administrators, such as a rooftop, mountaintop, and so on. If a configured MP fails and loses its configuration due to software bugs, hardware bugs such as frequent power outages or maloperation, it cannot rejoin the mesh network automatically. The human user has to manually recover the failed MP. According to embodiments of the present disclosure, in case of the failure of the MP such as losing the configuration, the failed MP can be recovered automatically by using the DPP authentication and configuration protocol, thereby reducing the maintenance cost for the mesh network.

Other advantages of embodiments of the present disclosure will be described with reference to the example implementation as described below. Reference is made below to FIG. 1 through FIG. 9 to illustrate basic principles and several example embodiments of the present disclosure herein.

As mentioned above, in discussion of some embodiments, mesh network and DDP protocol will be described by way of example. However, this by no means suggests any limitations as to the scope of the present disclosure. Principles as discussed herein can be applied to any other suitable technologies, either known at present or to be developed in the future.

FIG. 1 illustrates an example environment 100 in which embodiments of the present disclosure can be implemented. As shown in FIG. 1, the environment 100 comprises a WAN 110, a WLAN mesh network 120 (referred to simply as mesh network 120), and user devices 140-1, 140-2 and 140-3 (collectively referred to as 140).

The WAN 110 may be a network that spans regions, countries, or even the world. The WAN is generally used to connect LANs and other types of networks together to enable communications among different devices. Examples of the WAN include, but are not limited to, the Internet.

The mesh network 120 is wired to the WAN 110 through cable(s) 115, for example. The mesh network 120 comprises a plurality of APs acting as their respective network roles. For example, in a mesh network, some APs can be configured as mesh portals (MPPs), while the others are mesh points (MPs). In FIG. 1, for example, the APs 121 in the mesh network 120 include MPP 121-1 and MPs 121-2, 121-3, 121-4, 121-5 (collectively referred to as "AP 121").

An MPP is the gateway between the wireless mesh network and the wired LAN or WAN such as the Internet. An MPP uses its wired or wireless interface (such as an Ethernet port, 4G-modem) to establish a link to the wired LAN or WAN. In some cases, multiple MPPs are deployed in one mesh work to support redundant mesh paths from the wireless mesh network to the wired LAN or WAN.

An MP is configured to establish an all-wireless path to the MPP and to provide some WLAN services to the user devices or clients. The WLAN services comprise, but are not limited to, client connectivity, intrusion detection system (IDS) capabilities, user role association, LAN-to-LAN bridging, and Quality of Service (QoS) for LAN-to-mesh communication. In addition, the MP may also perform mesh backhaul and/or network connectivity.

As shown in FIG. 1, the MPP 121-1 is wired to the WAN 110, while the MPs 121-2, 121-3, 121-4 and 121-5 are connected wirelessly. The MPP 121-1 is the gateway between the wireless mesh network 120 and the WAN 110, while the MPs 121-2, 121-3, 121-4, 121-5 provide WLAN connectivity service for the user devices 140. In some embodiments, the mesh network 120 may be wired to another LAN.

The APs 121 are connected together via wireless mesh links to form the mesh network 120 based on their configurations. A configuration of an AP may comprise one or more parameters for connecting the wireless network, which include, but are not limited to, the network name or network identifier. The configurations of these APs may indicate a same identifier such as an ID specific to the mesh network (can be referred to as "mesh-ID"). The MPP 121-1 may broadcast the mesh ID, and the MPs 121-2, 121-3, 121-4 may then connect to the MPP 121-1 based on the mesh ID.

A mesh link 130-1 is established between the MPP 121-1 and the MP 121-2, a mesh link 130-2 is established between the MPP 121-1 and the MP 121-3, and a mesh link 130-3 is established between the MPP 121-1 and the MP 121-4. In this way, the MPs 121-2, 121-3, 121-4 can join the mesh network 120. The MPs 121-2, 121-3, 121-4 as well as the MPP 121-1, may broadcast the mesh ID of the mesh network 120. Then, depending on the path selection protocol and the path selection metric, the MP 121-5 may connect to the nearby MP 121-3 so as to establish a mesh link 130-4 between the MP 121-3 and the MP 121-5.

The MPs 121-2, 121-3, 121-4, 121-5 each provide the wireless connectivity services in the respective coverage area. For example, the MP 121-2 provides the wireless connectivity service via a wireless access link 150-1 to a user device 140-1 such as a laptop, the MP 121-5 provides the wireless connectivity service via a wireless access link 150-2 to a user device 140-2 such as a laptop, and the MP 121-4 provides the wireless connectivity service via a wireless access link 150-3 to a user device 140-3 such as a mobile device. It is to be understood that the mesh network 120 may have more MPPs and/or may have more or less MPs. In addition, each MP may provide wireless connectivity service to two or more user devices.

In some embodiments, the MPP, MP and/or any other devices in the example environment 100 may each include, but are not limited to, a processor or processing unit, a memory, a storage device, a communication unit. The processor or processing unit may perform various processes based on the programs or instructions stored in the memory. The storage device may include machine-readable media, which may be used for storing information and/or data. The communication unit may include one or more antennas for conducting wireless communications with other devices.

Figure 2A:
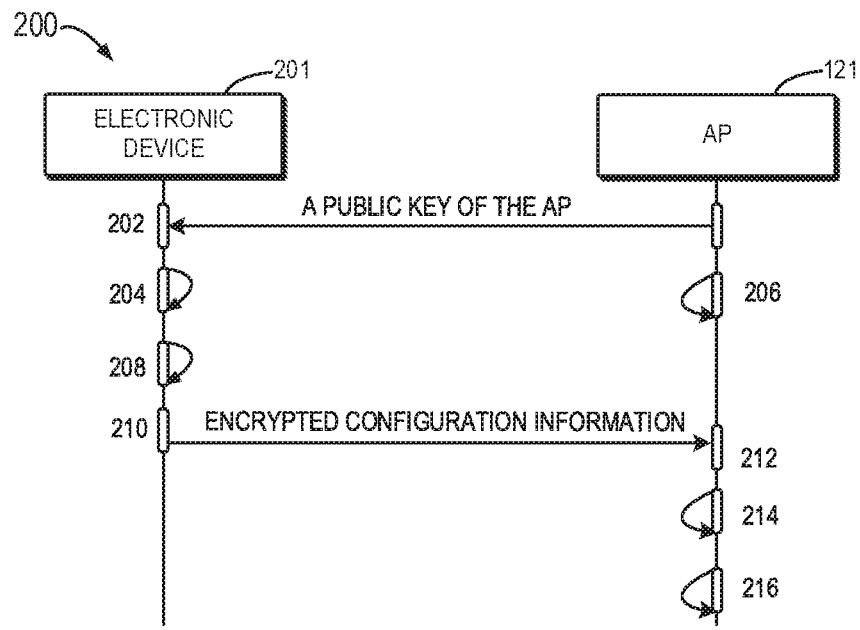
FIG. 2A illustrates a signaling chart of provisioning an AP for a mesh network in a wireless way according to embodiments of the present disclosure.
Figure 2B:
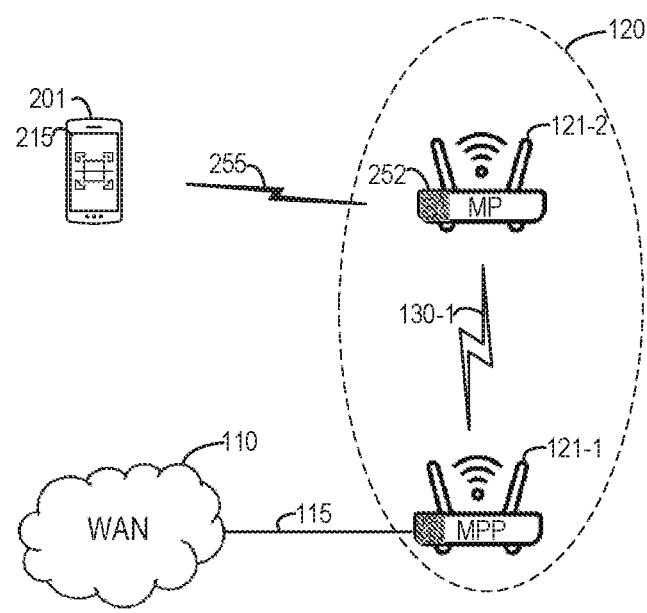
FIG. 2B illustrates an example environment for provisioning an AP for a mesh network in a wireless way according to embodiments of the present disclosure.

FIGS. 2A and 2B illustrate an example process for provisioning an AP for a mesh network in a wireless way according to embodiments of the present disclosure. In this process, an electronic device 201 is used to provision an AP 121 which may be either an MPP or an MP in the mesh network. The electronic device 201 may be any device that has wireless communication capacities, such as a smartphone, tablet, a dedicated device and so on.

As shown in FIG. 2A which illustrates a process 200, the electronic device 201 obtains (202) device information from the AP 121. The device information at least comprises a public key of the AP 121. In some embodiments, the device information may further comprise a global operating class channel, a channel list, a mac address, and so on.

The device information can be obtained in a variety of ways. For example, in the example of FIG. 2B, the AP acts as an MP 121-2. A user interface 215 can be presented on the electronic device 201, through which a user may operate a camera (not shown) of the electronic device 201 to scan the a visual code 252 printed or attached on the MP 121-2 to obtain the device information of the MP 121-2. Examples of the visual code include, but are not limited to, a Quick Response (QR) code, a bar code, or the like.

In addition to or instead of scanning visual code, the electronic device 201 may obtain the device information from the MP 121-2 through Near-field communication (NFC), Bluetooth, or a public key exchange (PKEX) and/or any other feasible communication technologies.

Still in reference to FIG. 2A, the electronic device 201 then generates (204) a key, and the AP 121 generates (206) the same key. That is, this key is shared between the electronic device 201 and the AP 121. For example, in some embodiments, the electronic device 201 may generate the key based on a private key of the electronic device 201 and a public key of the AP 121. Therefore, the key is also referred to as a "shared key." In this way, the electronic device 201 and the AP 121 have the same shared key which is not known to other devices. That is, this key is only known to the electronic device 201 and the AP 121. This shared key can be used by the electronic device 201 and the AP 121 to authenticate each other and transmit the configuration information. For example, in the example of FIG. 2B, after obtaining the public key of the MP 121-2, the electronic device 201 performs a mutual authentication with the MP 121-2, establishes a trusted wireless link 255, and generates the shared key.

The electronic device 201 may generate a configuration of the AP 121 based on a user input, or receive the configuration of the AP 121 from another device. The electronic device 201 encrypts (208) the configuration of the AP 121 using the shared key and transmits (210) the encrypted configuration information to the AP 121. Specifically, in order to improve the efficiency of obtaining the configuration information, the encrypted configuration information is transmitted in a wireless manner. For example, as shown in FIG. 2B, encrypted configuration information can be transmitted over the trusted wireless link 255 in an encryption form.

The AP 121 receives (212) the encrypted configuration information and decrypts (214) the encrypted configuration information using the shared key so as to determine its configuration. Then the AP 121 may connect (216) to the wireless multi-hop network according to its configuration. For example, in the example of FIG. 2B, the MP 121-2 establishes a mesh link 130-1 with the MPP 121-1 and joins a mesh network 120. Since the MPP 121-1 has been connected to the WAN 110 via the cable(s) 115, the MP 121-2 can also be connected to the WAN 110 via the mesh link 130-1. Then, the MP 121-2 may provide the wireless network connectivity service to the nearby user devices.

In aid of the process 200 as discussed above, the AP(s) in a wireless multi-hop network can be provisioned in a wireless, trusted way, which requires little manual intervention and technical expertise, while ensuring the safety of the provisioning. Thus, embodiments of the present disclosure can achieve a simpler and quicker deployment of a mesh network without connecting each AP to a wired LAN for provisioning.

Figure 3:
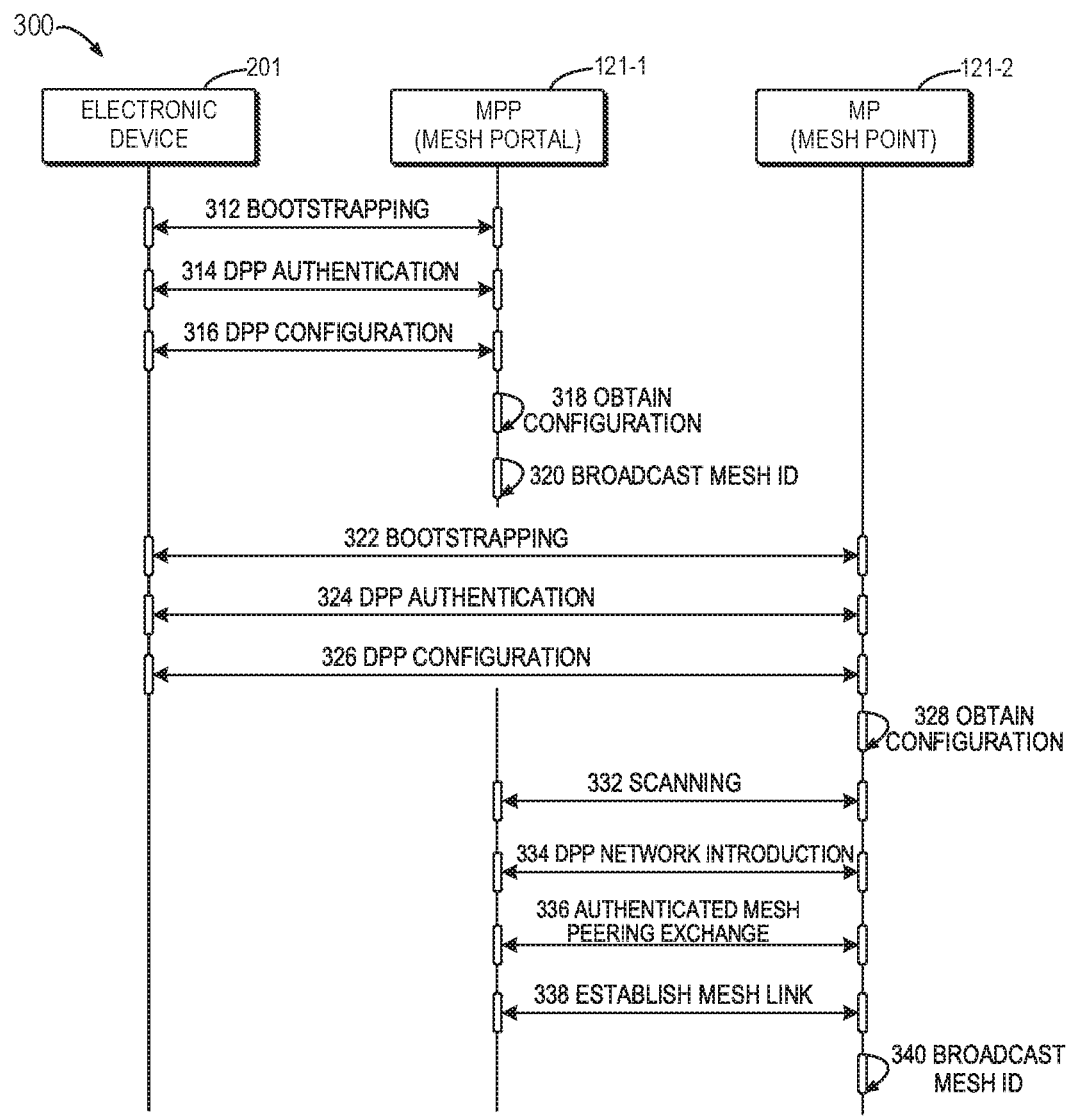
FIG. 3 illustrates a signaling chart of a specific example process of provisioning multiple APs for forming a mesh network according to embodiments of the present disclosure.

FIG. 3 illustrates a signaling chart of a specific example process 300 of provisioning APs for the mesh network according to embodiments of the present disclosure. In the process 300, a DPP is used to facilitate the provisioning of APs in the mesh network. It is to be understood that this is merely for illustration without suggesting any limitations as to the scope of the present disclosure.

To enable the DPP to support the mesh network, the DPP may be extended to introduce the parameter necessary for configuring the APs in the mesh network. For example, the DPP configuration protocol is extended for supporting mesh APs as shown in Table 1. In a DPP configuration attributes object, network role is the role that enrollee wishes to obtain. Besides present roles ("sta" and "ap") in the DPP, two new roles, MPP and MP, may be added to identify the type of the mesh AP. In addition, some other parameters for path selection may be also added to support mesh topology, as shown in Table 1.

TABLE 1

The extended DPP configuration attributes object

| Parameter | Name | Type | Value | Description |
| --- | --- | --- | --- | --- |
| Network role | netRole | STRING | sta, ap MPP, MP | The role of the AP in the mesh network. |
| Mesh ID | SSID | STRING | | The mesh network to be joined by the AP. |
| Path selection protocol identifier | protocol | STRING | | Optionally, the type of the path selection protocol. |
| Path selection metric identifier | metric | STRING | | Optionally, the path selection metric used by the path selection protocol. |

As shown in FIG. 3, three devices are involved in this process 300, namely, the electronic device 201 and two APs including the MPP 121-1 and the MP 121-2. Generally, the process 300 involves three stages. In the first stage, the electronic device 201 provisions the MPP 121-1 in a wireless manner. In the second stage, the electronic device 201 provisions the MP 121-2 in a wireless manner. The MPP 121-1 and MPP 121-1 can be provisioned using the process 200 as described above, for example. In the third stage, the MP 121-2 automatically connects to the MPP 121-1 to form a mesh network.

In the first stage, the electronic device 201 (acts as a configurator or initiator in the DPP) provisions the MPP 121-1 (acts as an enrollee or responder in the DPP). The electronic device 201 obtains (312) bootstrapping information from the MPP 121-1 using an out-of-band or in-band mechanism. The bootstrapping information may include bootstrapping a public key of the MPP 121-1, a global operating class channel, and a channel list for DPP authentication and so on. Bootstrapping is a form of original entity authentication (the step from which all subsequent authentication takes place), and comprises the transfer of a public key credential from the MPP 121-1 to the electronic device 201. Examples of the out-of-band mechanism for obtaining the bootstrapping information include, but are not limited to, a visual code such as a QR code, NFC tap, Bluetooth low energy exchange, or the like. Examples of the in-band mechanism include, but are not limited to, obtaining the bootstrapping information from a public cloud via the network, by using PKEX, or the like.

The electronic device 201 performs (314) a DPP authentication with the MPP 121-1 protocol by using the public key of the MPP 121-1. The electronic device 201 starts to operate on the channel indicated by the bootstrapping process by broadcasting DPP Authentication requests, and the MPP 121-1 monitors on the channel specified during bootstrapping. During the DPP authentication, a key that is shared between the electronic device 201 and the MPP 121-1 can be generated, for example, based on the public key and private key. This shared key can be used to encrypt the configuration information to be transmitted during the subsequent DPP configuration.

An example implementation of the DPP authentication may be as follows. The electronic device 201 transmits a DPP authentication request to the MPP 121-1 to request a mutual authentication. In the DPP authentication request, the electronic device 201 proves to the MPP 121-1 that it has the public key of the MPP 121-1. Then the MPP 121-1 transmits a DPP authentication response to the electronic device 201 to provide its authentication to the electronic device 201. In the DPP authentication response, the MPP 121-1 proves to the electronic device 201 that it has its public key and it is live. Next, the electronic device 201 transmits a DPP authentication confirmation to the MPP 121-1 to provide its authentication to the MPP 121-1. In the DPP authentication confirmation, the electronic device 201 proves to the MPP 121-1 that it has its public key and it is live. In this way, the electronic device 201 has authenticated the MPP 121-1, while the MPP 121-1 has also authenticated the electronic device 201. That is, a mutual authentication has been done between the electronic device 201 and the MPP 121-1. In addition, the electronic device 201 and the MPP 121-1 may each generate a shared key (such as an authenticated key) to protect subsequent exchange of the configuration information. For example, the shared key may be generated through some cryptographic techniques, such as elliptic curve Diffie-Hellman (ECDH) and some negotiation processes.

Continuing to refer to FIG. 3, the electronic device 201 and MPP 121-1 perform (316) the DPP configuration according to the DPP configuration protocol. For example, the MPP 121-1 sends a DPP configuration request encrypted with the shared key to the electronic device 201, and the electronic device 201 sends a DPP configuration response encrypted with the shared key to the MPP 121-1, where the DPP configuration response comprises the configuration of the MPP 121-1. The DPP configuration protocol enables provisioning from electronic device 201 to MPP 121-1 with network role, mesh ID, authentication and key management type (AKM) and so on. If the DPP network introduction protocol is used to derive a pairwise master key (PMK), the configuration may include a connector that is a signed introduction that allows the MPP 121-1 obtain a trusted identifier, which is similar to a certificate. If the DPP network introduction protocol is not used, the configuration may include a shared passphrase or key.

The MPP 121-1 obtains (318) its configuration by decrypting the received information using the shared key. Since MPP 121-1 acts as an MPP in the mesh network, it will broadcast (320) the mesh ID as configured in the configuration.

Then, the process 300 enters into the second stage, the electronic device 201 provisions the MP 121-2 by using the DPP. The electronic device 201 obtains (322) bootstrapping information from the MP 121-2 using an out of band mechanism, such as scanning QR code, NFC tap, or Bluetooth low energy exchange and so on. The electronic device 201 performs (324) a DPP authentication with the MP 121-2. The DPP configuration is performed (326) based on the DPP configuration protocol, and the configuration of the MP 121-2 is transmitted from the electronic device 201 to the MP 121-2. The MP 121-2 may obtain (328) its configuration by decrypting the received information using the shared key that is shared between the electronic device 201 and the MP 121-2.

In the third stage, the MP 121-2 establishes a mesh link with the MPP 121-1. The MP 121-2 scans (332) and discovers the MPP 121-1, and the MP 121-2 connects (334) to the MPP 121-1 based on a DPP network introduction protocol. Upon generation of PMK and PMKID based on the DPP introduction protocol or shared PSK, authenticated mesh peering exchange (AMPE) may be performed (336). The AMPE will establish (338) a secure mesh link between MPP 121-1 and MP 121-2. Accordingly, the MP 121-2 can connect to the MPP 121-1 and join the mesh network. The MP 121-2, which has joined the mesh network, may also broadcast (340) the mesh ID so as to be discovered and connected by other MP(s). As such, the mesh work can be deployed easily and efficiently with the help of DPP, which requires little manual intervention and technical expertise, while ensuring the safety of the provisioning.

Figure 4:
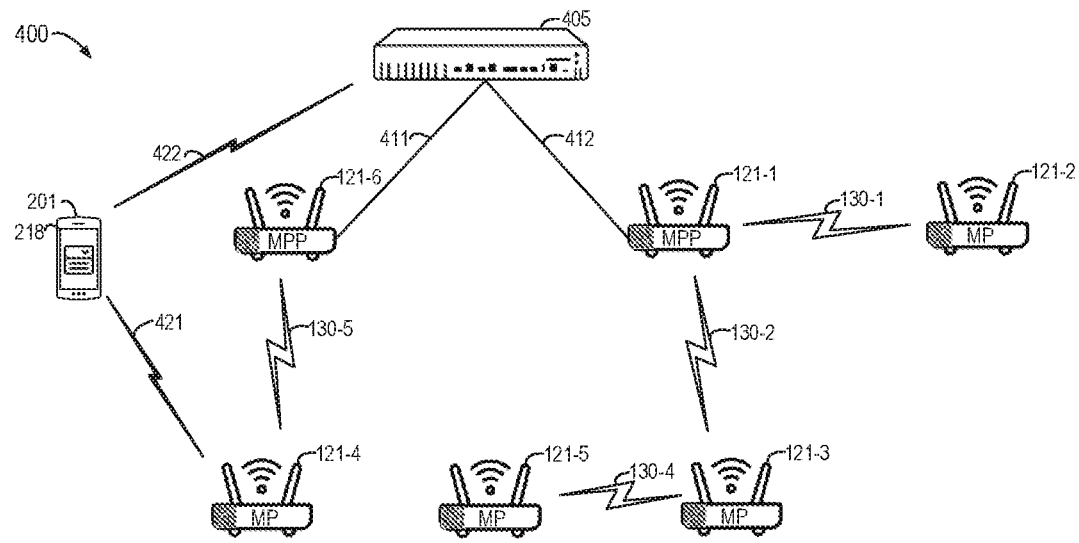
FIG. 4 illustrates another example environment in which embodiments of the present disclosure can be implemented.

FIG. 4 illustrates another example environment 400 in which embodiments of the present disclosure can be implemented. Compared with FIG. 1, the mesh network in FIG. 4 may include multiple MPPs 121-6, 121-1 and a controller 405. The MPPs 121-6 and 121-1 are wired to the controller 405 via the cables 411 and 412, respectively, and they may obtain their configurations from the controller 405 or through the electronic device 201. The controller 405 may provide centralized provisioning, centralized configuration, policy definition, ongoing network management, or wireless and security services and so on. It is to be understood that the controller 405 may be a logic entity that manages the mesh network and may be located anywhere in the network. In some embodiments, the user may configure the AP via the controller 405 and/or the electronic device 201.

The user may use the electronic device 201 (such as a smartphone) to provision APs (such as MPs) for the mesh network in a wireless way. For example, the user may use the electronic device 201 to scan the QR code on the MP 121-4 so as to obtain the bootstrapping information of the MP 121-4. The electronic device 201 sends the bootstrapping information of the MP 121-4 to the controller 405 via the wireless link 422, and receives the configuration of the MP 121-4 from the controller 405. Then, the electronic device 201 sends the configuration to the MP 121-4 via the wireless trusted link 421. After obtaining the configuration, the MP 121-4 establishes the mesh link 130-5 with the nearby MPP 121-6 and joins the mesh network.

As shown in the user interface 218 on the electronic device 201 in FIG. 4, the user of the electronic device 201 may set the network role of the MP 121-4 manually. In some embodiments, the electronic device 201 and the MP 121-4 may perform a DPP authentication and establish the wireless trusted link 421. In this way, a mutual authentication can be performed with the help of DPP, thereby ensuring the safety for the transmission of the configuration to the MP 121-4.

Figure 5A:
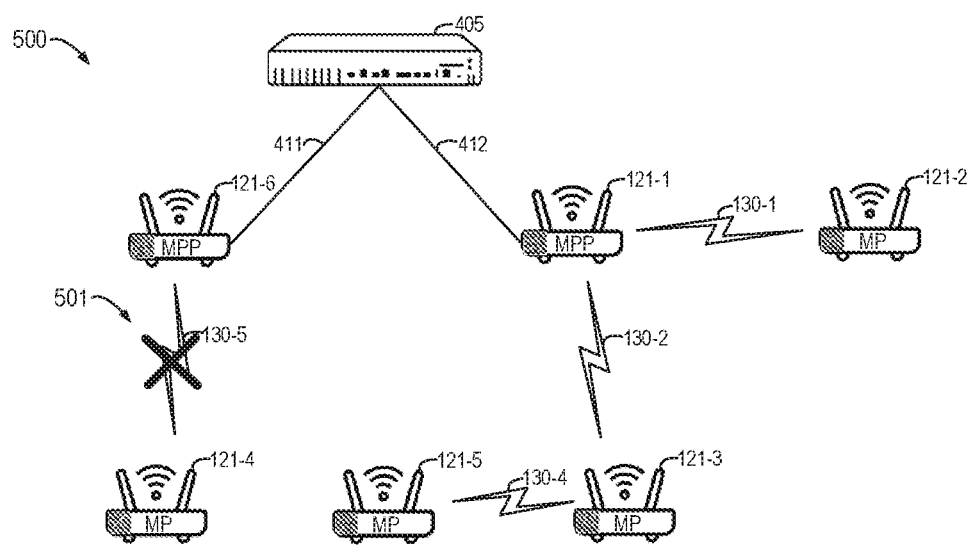
FIGS. 5A-5B illustrate an example process for recovering a failed AP in the mesh network automatically according to embodiments of the present disclosure.
Figure 5B:
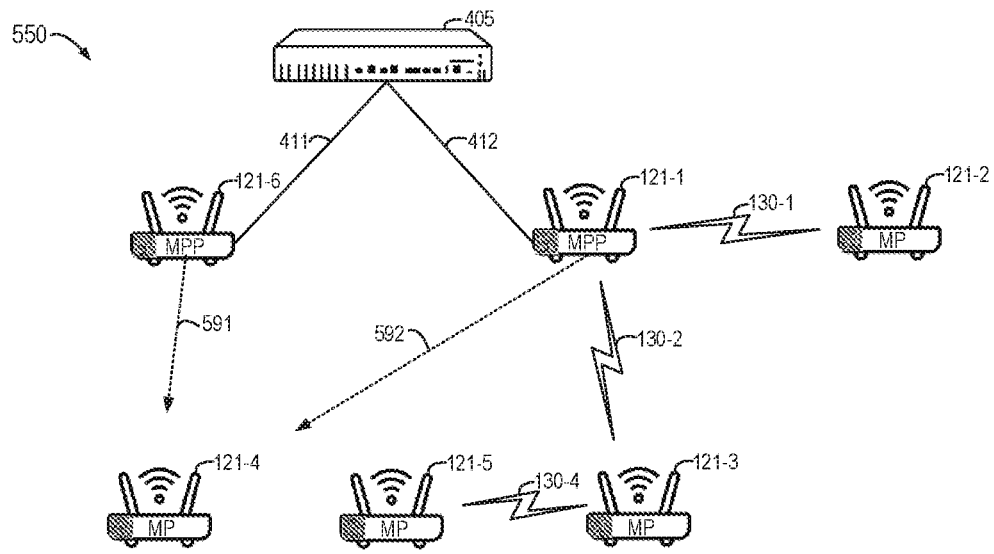

FIGS. 5A-5B illustrate an example process for recovering a failed AP in the mesh network automatically according to embodiments of the present disclosure. FIG. 5A illustrates an environment 500 where the MP 121-4 fails. As indicated by 501, at some point, the mesh link 130-5 is lost and the MPP 121-4 disconnects from the mesh network, because the MP 121-4 may have a failure such as losing its configuration.

FIG. 5B illustrates an environment 550 for recovering the failed MP 121-4 automatically. The controller 405 has obtained the bootstrapping information of the APs 121, so it may enable some or all of the live APs as relays to transmit the DPP authentication request continually. The controller 405 finds that the MP 121-4 is offline, and it will enable the MPPs 121-6 and 121-1 to broadcast DPP authentication requests for the failed MP 121-4, as indicated by 591 and 592. In some embodiments, in addition to the MPPs 121-6 and 121-1, the live MPs 121-2, 121-3 and 121-5 may also broadcast a DPP authentication request for the failed MP 121-4.

Since the failed MP 121-4 cannot find its configuration, it will monitor the DPP authentication request. Once the failed MP 121-4 receives the DPP authentication request from the MPP 121-6 or 121-1, the failed MP 121-4 will transmit a DPP authentication response to the MPP 121-6 or 121-1. For example, the failed MP 121-4 may choose the MPP 121-6 because of the better signal quality.

After the failed MP 121-4 is paired with the MPP 121-6, a mutual authentication may be performed between the MPP 121-6 and the failed MP 121-4 based on DPP authentication protocol. Then, the configuration of the MP 121-4 may be transmitted from the MPP 121-6 to the failed MP 121-4 based on DPP configuration protocol, and the failed MP 121-4 can re-obtain its configuration and rejoin the mesh network according to the configuration. In this way, in case of the failure of an MP, the failed MP can be recovered automatically by using the DPP authentication and configuration protocol, thereby reducing the maintenance cost for the mesh network. That is, once the problematic MP hears one that is trusted speaking to it, it may start DPP procedures and re-obtain a necessary configuration to rejoin the mesh network. According to embodiment of the present disclosure, the recovery processes are automatic and without human intervention.

Figure 6:
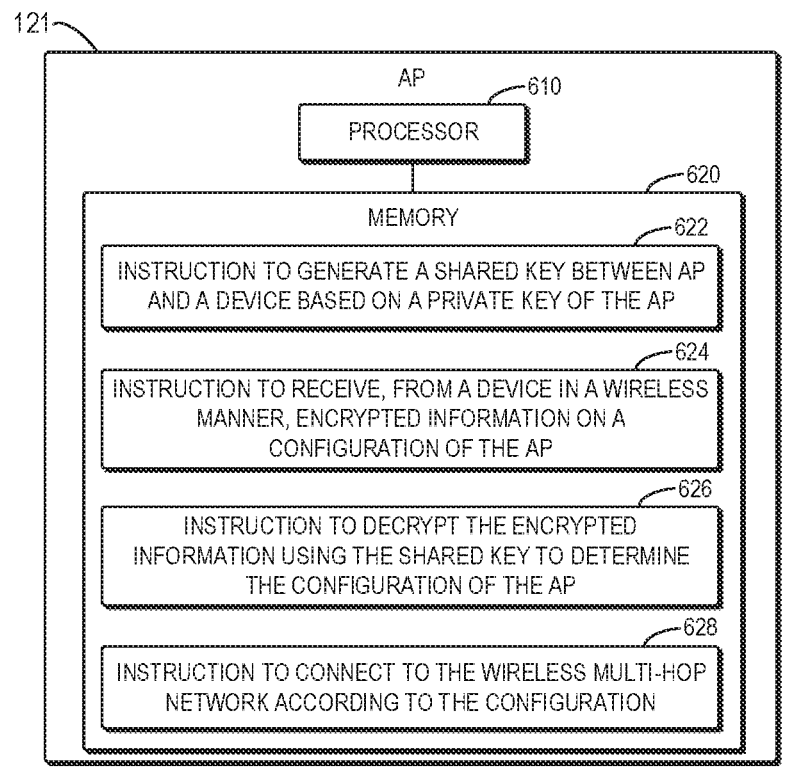
FIG. 6 illustrates an example AP according to embodiments of the present disclosure.

FIG. 6 illustrates an example AP 121 according to embodiments of the present disclosure. It is to be understood that the AP 121 may be implemented as the MPP 121-1 or 121-6, or the MP 121-2, 121-3, 121-4, or 121-5 as described in FIGS. 1-5B.

As shown in FIG. 6, the AP 121 comprises a processor 610 and a memory 620 coupled to the processor 610. The memory 620 stores instructions 622, 624, 626, 628 to cause the processor 610 to perform some acts.

As shown in FIG. 6, the memory 620 stores instruction 622 to generate a shared key between the AP 121 and a device based at least in part on a private key of the AP. For example, a mutual authentication may be performed between the AP 121 and an electronic device, and the AP 121 and the electronic device may each generate the shared key that is shared between them.

The memory 620 stores instruction 624 to receive, from the device in a wireless manner, encrypted information on a configuration of the AP 121. For example, the AP 121 may receive its configuration for connecting to a wireless multi-hop network via a wireless trusted connection.

The memory 620 stores instruction 626 to decrypt the encrypted information using the shared key to determine the configuration of the AP 121, wherein the configuration at least indicates an identifier of a wireless multi-hop network and a network role of the AP in the wireless multi-hop network. For example, the AP 121 may obtain its configuration by performing a decryption, and determine the wireless multi-hop network to be connected and its network role.

The memory 620 stores instruction 628 to connect to the wireless multi-hop network according to the configuration. After determining the configuration for connecting to the wireless multi-hop network, the AP 121 knows the target network. For example, the AP 121 may connect other AP(s) based on the identifier of wireless multi-hop network and the network role as configured in the configuration.

Accordingly, embodiments of the present disclosure propose a new approach for provisioning an AP for a wireless multi-hop network in a wireless trusted way, which requires little manual intervention and technical expertise, while ensuring the safety of the provisioning.

In some embodiments, the mutual authentication between the AP 121 and the electronic device may be achieved by using the DPP authentication protocol. For example, the AP 121 may receive, from the electronic device, a DPP authentication request indicating a public key of the AP and a public key of the device, and transmit a DPP authentication response to the electronic device, and receive a DPP authentication confirmation from the electronic device. For example, the DPP authentication request comprises a hash of the public key of the AP and a hash of the public key of the device. In this way, by using a DPP authentication protocol to help to perform a mutual authentication between the electronic device and the AP 121, the safety of provisioning of the AP in the mesh network can be further ensured.

In some embodiments, the configuration of the AP 121 may comprise one of the following: a connector used for establishing a security association using a DPP network introduction protocol, a shared passphrase, or a pre-shared key (PSK). As such, AP 121 may use the identifier of the wireless multi-hop network and the corresponding credential to connect to other nearby AP(s). In addition, by using the DPP network introduction protocol, the safety for connecting the nearby AP(s) can be ensured.

In some embodiments, the wireless multi-hop network may be a mesh network, and the DPP may be extended to support the provisioning for the mesh network. For example, the network role parameter in the DPP configuration protocol may be extended to add the values of the MPP and MP, and the identifier parameter may be added in the DPP configuration protocol to enable the AP to join the configured mesh network. In this way, AP 121 may connect to the mesh network according to its network role (such as advertising or scanning), and the extended DPP protocol can support the mesh network.

In other embodiments, the DPP configuration protocol may be extended to support more parameters specific to the mesh network, such as a path selection protocol identifier and a path selection metric identifier. In this way, the extended DPP protocol can be more compatible with the mesh network. The mesh standard includes a default mandatory path selection protocol (HWMP) and default mandatory path selection metric (Airtime Link Metric) for all implementations, to ensure minimum capabilities for interoperability between devices from different users. However, the standard also allows any user to implement any path selection protocol and/or path selection metric in the mesh framework to meet special application needs, for instance with high mobility of MPs. Accordingly, by adding the path selection protocol identifier and the path selection metric identifier into the DPP configuration protocol, more flexible path selection schemes can be achieved for the mesh network.

In some embodiments, if the AP 121 acts as an MPP in the mesh network, the AP 121 will broadcast the mesh ID, and establish at least one secure mesh link with at least one MP based on the mesh ID and the credential. In other embodiments, if the AP 121 acts as an MP in the mesh network, the AP 121 will scan and connect to other AP(s) which broadcasts the same mesh ID, and establishes a secure mesh link with other AP(s) based on the credential. After the MP has been connected to the mesh network, it also broadcasts the mesh ID and enables other AP(s) to scan and discover it.

In some embodiments, for a mesh network that has been configured and deployed, if an MP in the mesh network fails and loses its configuration due to software bugs or frequent power outages, the MPP(s) in the mesh network may broadcast a DPP authentication request, and the failed MP monitors the DPP authentication request. Once the failed MP receives the DPP authentication request from the MPP, the failed MP will transmit a DPP authentication response to the MPP, and a mutual authentication may be performed between the MPP and the MP based on DPP authentication protocol. Then, the configuration of the failed MP may be transmitted from the MPP to the failed MP based on DPP configuration protocol, and the failed MP can re-obtain its configuration and rejoin the mesh network according to the configuration. In this way, in case of the failure of an MP, the failed MP can be recovered automatically by using the DPP authentication and configuration protocol, thereby reducing the maintenance cost for the mesh network.

Figure 7:
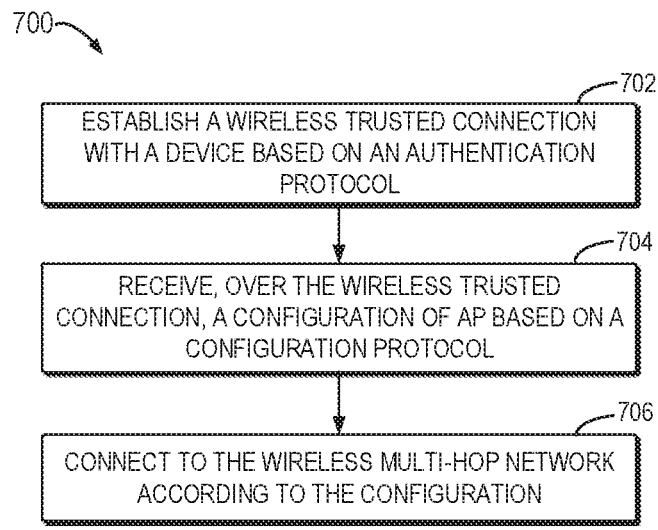
FIG. 7 illustrates a flow chart of an example method for connecting an AP to the wireless multi-hop network according to embodiments of the present disclosure.

FIG. 7 illustrates a flow chart of an example method 700 for connecting an AP to the wireless multi-hop network according to embodiments of the present disclosure. It is to be understood that the method 700 may be executed by the AP 121, the MPP 121-1 or 121-6, or the MP 121-2, 121-3, 121-4, or 121-5 as described in FIGS. 1-6.

At 702, the AP establishes a wireless trusted connection with a device based on an authentication protocol. By using the authentication protocol, the AP and an electronic device may perform a mutual authentication and generate a shared key to encrypt and decrypt the configuration. In some embodiments, the authentication protocol may be the DPP authentication protocol. Alternatively, other authentication protocols for authenticating two devices each other may be also used in combination with the method 700. For example, the shared key may be generated through some cryptographic techniques, such as elliptic curve Diffie-Hellman (ECDH) and some negotiation processes.

At 704, the AP receives, over the wireless trusted connection, a configuration of an AP based on a configuration protocol, wherein the configuration at least indicates an identifier of a wireless multi-hop network. For example, by using the configuration protocol, the AP may obtain its configuration in a wireless trusted manner. In some embodiments, the configuration protocol may be the DPP configuration protocol. Alternatively, other configuration protocols for transmitting the configuration between two devices in safety may be also used in combination with the method 700.

At 706, the AP connects to the wireless multi-hop network according to the configuration. After receiving the configuration for connecting to the wireless multi-hop network, the AP knows the target network. For example, the AP may connect to other AP(s) based on the identifier of the wireless multi-hop network.

Accordingly, the method 700 according to the present disclosure can achieve a simple and safe way for provisioning the AP for the wireless multi-hop network, and can reduce the human intervention while ensuring safety.

Figure 8:
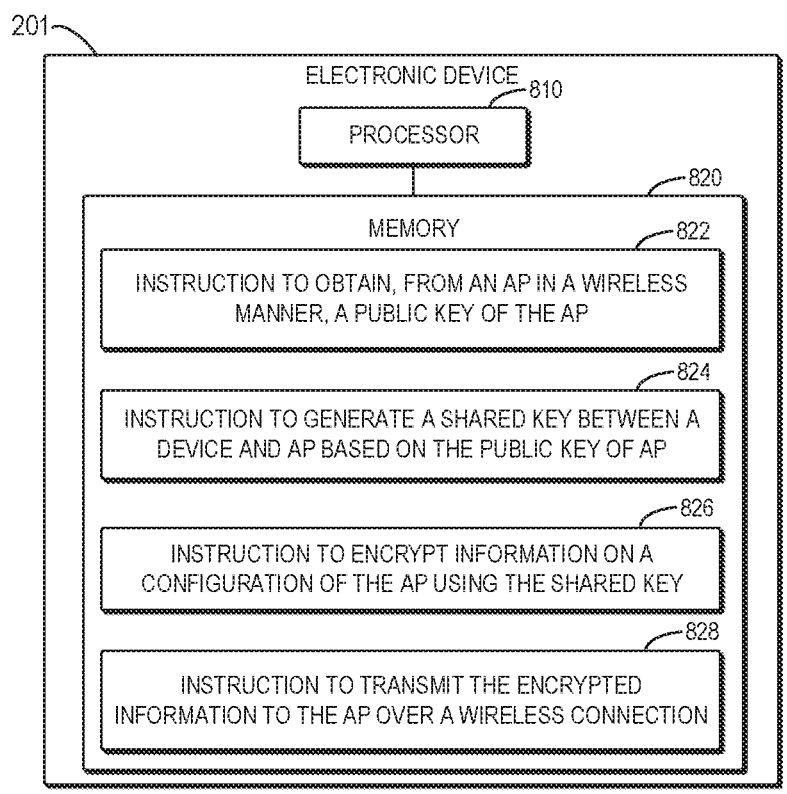
FIG. 8 illustrates an example electronic device according to embodiments of the present disclosure.

FIG. 8 illustrates an example electronic device 201 according to embodiments of the present disclosure. As shown in FIG. 8, the electronic device 201 comprises a processor 810 and a memory 820 coupled to the processor 810. The memory 820 stores instructions 822, 824, 826, 828 to cause the processor 810 to perform some acts.

As shown in FIG. 8, the memory 820 stores instruction 822 to obtain, from an AP in a wireless manner, device information comprising a public key of the AP. For example, the electronic device 201 may obtain the device information from the AP through scanning of a QR code, NFC, or Bluetooth and so on.

As shown in FIG. 8, the memory 820 stores instruction 824 to generate a shared key between the device and the AP based at least in part on the public key of the AP. For example, a mutual authentication may be performed between an electronic device 201 and the AP that has been scanned, and the electronic device 201 and the AP may each generate the shared key that is shared between them.

As shown in FIG. 8, the memory 820 stores instruction 826 to encrypt configuration information on a configuration of the AP using the shared key, wherein the configuration at least indicates an identifier of a wireless multi-hop network and a network role of the AP in the wireless multi-hop network. By using the shared key to encrypt the configuration information of the AP, the electronic device 201 can ensure that only the paired AP can obtain the configuration.

As shown in FIG. 8, the memory 820 stores instruction 828 to transmit the encrypted configuration information to the AP over a wireless connection. The configuration information is encrypted using a shared key between the electronic device 201 and the AP, and is transmitted from the electronic device 201 to the AP in a wireless trusted manner. Thus, embodiments of the present disclosure require little manual intervention and technical expertise, while ensuring the safety of the provisioning.

In some embodiments, the electronic device 201 may establish a wireless trusted connection with the AP based on DPP authentication protocol. For example, the electronic device 201 may transmit, to the AP, a DPP authentication request indicating a public key of the AP and a public key of the electronic device, and receive a DPP authentication response from the AP, and transmit a DPP authentication confirmation to the AP. In this way, by using DPP authentication protocol to help to perform a mutual authentication between the electronic device and the AP, the safety of provisioning of the AP can be further ensured.

In some embodiments, the wireless multi-hop network may be a mesh network, and the DPP may be extended to support the provisioning for the mesh network. For example, the network role parameter in the DPP configuration protocol may be extended to add the values of MPP and MP, and the identifier parameter may be added in the DPP configuration protocol to enable the AP to join the configured mesh network. In some embodiments, the electronic device 201 may provide a user interface to input or select the mesh ID and the network role of the AP to be configured. In this way, the AP can connect to the mesh network according to its network role (such as advertising or scanning), and the extended DPP protocol can support the mesh network.

In some embodiments, for some scenarios (such as a home network), the electronic device 201 may generate the configuration information for the AP based on the user input, such as the input or selected mesh ID and network role. For example, in the home network, the user needs to set some required parameters including network role, mesh ID and shared passphrase or key in a mobile APP, then scan QR code of the AP. After that, the mesh network will be formed automatically.

In some other embodiments, for other scenarios (such as enterprise network), there is usually a controller to manage the mesh network for the safety and reliability, and the controller may provide the functions such as centralized provisioning, centralized configuration, policy definition, ongoing network management, or wireless and security services. As such, the electronic device 201 transmits the device information obtained from AP to the controller, and it is the controller that generates the configuration of the AP. The controller sends the configuration of the AP to the electronic device 201, and the electronic device 201, as a relay, sends the configuration to the AP. Once the AP receives its configuration, the AP decrypts the received information and connects to other AP(s) in the mesh network according to the configuration.

Figure 9:
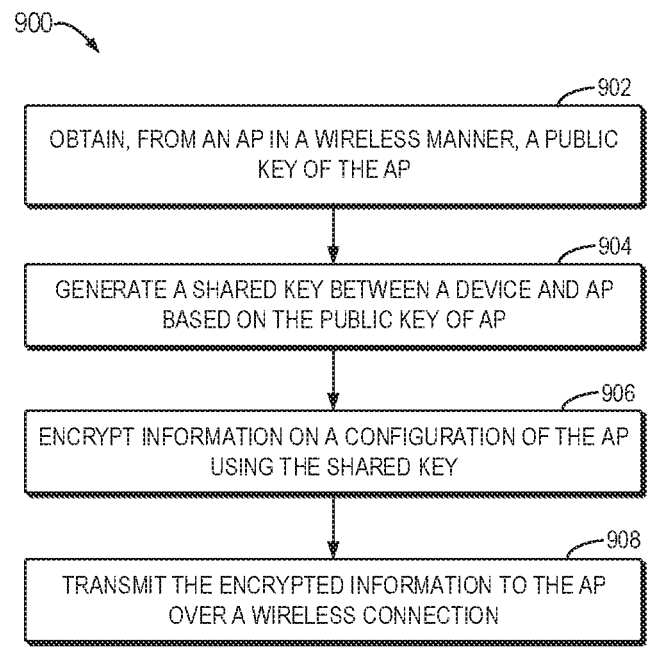
FIG. 9 illustrates a flow chart of an example method for provision an AP according to embodiments of the present disclosure.

FIG. 9 illustrates a flow chart of an example method 900 for provision of an AP according to embodiments of the present disclosure. It is to be understood that the method 900 may be executed by the electronic device 201 as described in FIGS. 1-8.

At 902, the electronic device 201 obtains, from an AP in a wireless manner, device information comprising a public key of the AP. At 904, the electronic device 201 generates a shared key between the device and AP based on the public key of the AP. At 906, the electronic device 201 encrypts configuration information on a configuration of the AP using the shared key. At 908, the electronic device 201 transmits the encrypted configuration information to the AP over a wireless connection. In this way, the AP can be provisioned easily and effectively.

Program codes or instructions for carrying out methods of the present disclosure may be written in any combination of one or more programming languages. These program codes or instructions may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine or entirely on the remote machine or server.

In the context of this disclosure, a machine-readable medium may be any tangible medium that may contain, or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate embodiments may also be implemented in combination in a single implementation. Conversely, various features that are described in the context of a single implementation may also be implemented in multiple embodiments separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed:

1. An access point (AP) comprising:
   a processor; and
   a memory coupled to the processor, the memory storing instructions to cause the processor to perform acts comprising:
   generating a shared key between the AP and a device based at least in part on a private key of the AP;
   receiving, from the device over a first wireless communication link, encrypted information on a configuration of the AP;
   decrypting the encrypted information using the shared key to determine the configuration of the AP, the configuration at least indicating an identifier of a wireless multi-hop network and a network role of the AP in the wireless multi-hop network;
   connecting to the wireless multi-hop network according to the configuration; and
   in accordance with a determination that another AP in the wireless multi-hop network fails,
   transmitting an authentication request for the another AP;
   receiving an authentication response from the another AP; and
   in accordance with a determination that the authentication response is received from the another AP, transmitting, to the another AP over a second wireless communication link, encrypted information on a configuration of the another AP for reconnecting to the wireless multi-hop network.

2. The AP according to claim 1, wherein the acts further comprise:
   receiving, from the device, a Device Provision Protocol (DPP) authentication request indicating a public key of the AP and a public key of the device;
   transmitting, to the device, a DPP authentication response to provide an authentication to the device; and
   receiving, from the device, a DPP authentication confirmation indicating a mutual authentication.

3. The AP according to claim 1, wherein the decrypting the encrypted information using the shared key to determine the configuration of the AP comprises:
   obtaining, from the encrypted information, a credential for connecting to the wireless multi-hop network, the credential comprising one of the following: a connector for establishing a security association using a Device Provision Protocol (DPP) network introduction protocol, a shared passphrase, or a pre-shared key (PSK).

4. The AP according to claim 3, wherein the wireless multi-hop network is a mesh network, and the connecting to the wireless multi-hop network according to the configuration comprises:
   determining, according to the configuration, the network role of the AP as to whether the AP acts as a mesh portal (MPP) or a mesh point (MP) in the mesh network; and
   connecting to the mesh network according to the network role of the AP and the credential.

5. The AP according to claim 4, wherein the connecting to the mesh network according to the network role of the AP comprises:
   in accordance with a determination that the AP acts as an MPP in the mesh network,
      broadcasting the identifier of the mesh network; and
      establishing at least one secure mesh link with at least one MP in the mesh network based on the identifier of the mesh network and the credential.
6. The AP according to claim 5, wherein the another AP is an MP in the mesh network.
7. The AP according to claim 4, wherein the connecting to the mesh network according to the network role of the AP comprises:
   in accordance with a determination that the AP acts as an MP in the mesh network,
      connecting to a further AP which broadcasts the identifier of the mesh network based on the credential; and
      broadcasting the identifier of the mesh network.
8. The AP according to claim 7, wherein the acts further comprise:
   in accordance with a determination that the AP fails, monitoring an authentication request from an MPP in the mesh network;
   in accordance with receiving the authentication request from the MPP, transmitting an authentication response to the MPP;
   receiving, from the MPP over a third wireless communication link, encrypted information on the configuration of the AP;
   decrypting the encrypted information to determine the configuration of the AP; and
   reconnecting to the mesh network according to the configuration.
9. The AP according to claim 1, wherein the decrypting the encrypted information using the shared key to determine the configuration of the AP comprises:
   determining, from the encrypted information, a first identifier of a path selection protocol and a second identifier of a path selection metric for selecting a path for connecting to the wireless multi-hop network.
10. An access point (AP) comprising:
   a processor; and
   a memory coupled to the processor, the memory storing instructions to cause the processor to perform acts comprising:
      generating a shared key between the AP and a device based at least in part on a private key of the AP;
      receiving, from the device over a first wireless communication link, encrypted information on a configuration of the AP;
      decrypting the encrypted information using the shared key to determine the configuration of the AP, the configuration at least indicating an identifier of a mesh network and a network role of the AP in the mesh network;
      connecting to the mesh network according to the configuration; and
      in accordance with a determination that the AP fails, monitoring an authentication request from a mesh portal (MPP) in the mesh network;
      in accordance with receiving the authentication request from the MPP, transmitting an authentication response to the MPP;
      receiving, from the MPP over a second wireless communication link, encrypted information on the configuration of the AP;
      decrypting the encrypted information to determine the configuration of the AP; and
      reconnecting to the mesh network according to the configuration.
11. The AP according to claim 10, wherein the acts further comprise:
   receiving, from the device, a Device Provision Protocol (DPP) authentication request indicating a public key of the AP and a public key of the device;
   transmitting, to the device, a DPP authentication response to provide an authentication to the device; and
   receiving, from the device, a DPP authentication confirmation indicating a mutual authentication.
12. The AP according to claim 10, wherein the decrypting the encrypted information using the shared key to determine the configuration of the AP comprises:
   obtaining, from the encrypted information, a credential for connecting to the mesh network, the credential comprising one of the following: a connector for establishing a security association using a Device Provision Protocol (DPP) network introduction protocol, a shared passphrase, or a pre-shared key (PSK).
13. The AP according to claim 12, wherein connecting to the mesh network according to the configuration comprises:
   determining, according to the configuration, the network role of the AP as to whether the AP acts as a MPP or a mesh point (MP) in the mesh network; and
   connecting to the mesh network according to the network role of the AP and the credential.
14. The AP according to claim 13, wherein the connecting to the mesh network according to the network role of the AP comprises:
   in accordance with a determination that the AP acts as an MPP in the mesh network,
      broadcasting the identifier of the mesh network; and
      establishing at least one secure mesh link with at least one MP in the mesh network based on the identifier of the mesh network and the credential.
15. The AP according to claim 14, wherein the acts further comprise:
   in accordance with a determination that an MP in the mesh network fails, transmitting an authentication request for the MP;
   receiving an authentication response from the MP; and
   in accordance with a determination that the authentication response is received from the MP, transmitting, to the MP over the second wireless communication link, encrypted information on a configuration of the MP for reconnecting to the mesh network.
16. The AP according to claim 13, wherein the connecting to the mesh network according to the network role of the AP comprises:
   in accordance with a determination that the AP acts as an MP in the mesh network,
      connecting to a further AP which broadcasts the identifier of the mesh network based on the credential; and
      broadcasting the identifier of the mesh network.
17. The AP according to claim 10, wherein the decrypting the encrypted information using the shared key to determine the configuration of the AP comprises:
   determining, from the encrypted information, a first identifier of a path selection protocol and a second identifier of a path selection metric for selecting a path for connecting to the mesh network.

* * * * *